United States Patent [19]

Gonser et al.

[11] Patent Number: 5,293,432
[45] Date of Patent: Mar. 8, 1994

[54] DOCUMENT IMAGE SCANNER WITH VARIABLE RESOLUTION WINDOWS

[75] Inventors: Karl E. Gonser, Camarillo; Curtis S. Averill, Thousand Oaks; Wiley B. Gilreath, Simi Valley; Mark S. Laughery, Moorpark, all of Calif.

[73] Assignee: Terminal Data Corporation, Moorpark, Calif.

[21] Appl. No.: 906,706

[22] Filed: Jun. 30, 1992

[51] Int. Cl.$^5$ .............................................. G06K 9/42
[52] U.S. Cl. ........................................ 382/47; 382/44; 345/127
[58] Field of Search ...................... 382/47, 44, 27, 22; 340/731

[56] References Cited

U.S. PATENT DOCUMENTS

| | | | |
|---|---|---|---|
| 4,476,497 | 10/1984 | Oshikoshi et al. | 358/298 |
| 4,573,200 | 2/1986 | Bednar et al. | 382/47 |
| 4,575,769 | 3/1986 | Arnoldi | 358/285 |
| 4,628,534 | 12/1986 | Marshall | 382/47 |
| 4,631,598 | 12/1986 | Burkhardt et al. | 358/280 |
| 4,656,664 | 4/1987 | Anderson et al. | 382/47 |
| 4,712,140 | 12/1987 | Mintzer et al. | 382/47 |
| 4,725,892 | 2/1988 | Suzuki et al. | 382/47 |
| 4,751,507 | 6/1988 | Hama et al. | 340/724 |
| 4,771,471 | 9/1988 | Kitamura | 382/47 |
| 4,783,652 | 11/1988 | Lumelsky | 358/283 |
| 4,918,542 | 4/1990 | Nagashima et al. | 358/451 |
| 4,924,522 | 5/1990 | Bray et al. | 382/56 |
| 4,942,479 | 7/1990 | Kanno | 358/448 |
| 4,972,273 | 11/1990 | Burkhardt et al. | 358/443 |
| 4,979,229 | 12/1990 | Moolenaar | 382/47 |
| 5,053,885 | 10/1991 | Telle | 382/47 |
| 5,068,905 | 11/1991 | Hackett et al. | 382/47 |
| 5,097,518 | 3/1992 | Scott et al. | 382/47 |
| 5,153,936 | 10/1992 | Morris et al. | 382/47 |
| 5,170,442 | 12/1992 | Murai et al. | 382/47 |

Primary Examiner—Joseph Mancuso
Attorney, Agent, or Firm—Blakely Sokoloff Taylor & Zafman

[57] ABSTRACT

A document image scanner for reading a scanned document multiple times at resolutions different from the scanned resolution without rescanning. A sensor scans the source document to generate a digitized image that is stored in a memory at a first resolution. An input shifter is coupled to the memory for receiving a first number of pixels per line of the digitized image from memory. A vertical scaling element is coupled to the memory for changing a first vertical resolution to a second vertical resolution as the digitized image is transferred to the input shifter from memory. An output shifter is coupled to the input shifter for receiving a second number of pixels per line of the digitized image from the input shifter, wherein the ratio of the second number to the first number is the scaling factor. A horizontal scaling element is coupled to the memory for changing a first horizontal resolution to a second horizontal resolution as the digitized image is transferred to the output shifter from the input shifter. The horizontal scaling element causes the output shifter to receive the second number of pixels per line. An edge retention element is coupled to the horizontal and/or vertical scaling elements and to the input shifter for preserving an edge transition between pixels as they are transferred to the output shifter when the second resolution is less than the first resolution. The document further comprises a windowing element coupled to the vertical scaling element for selecting a portion of the digitized image to be transferred to the input shifter.

21 Claims, 5 Drawing Sheets

Edge between Pixels 2, 3, & 4 is not retained

Edge is retained between Pixels 2, 3 & 4 by forcing Pixel 3 to be the alternate color.

Fig. 5 (b)

Edges between Pixels 2, 3, 4 & 5 are not retained when Pixel 3 is skipped

Edges are retained by forcing Pixels 3 & 4 to be thin alternative color

DOCUMENT IMAGE SCANNER WITH VARIABLE RESOLUTION WINDOWS

BACKGROUND OF THE INVENTION

1. Field of the Invention

The present invention relates generally to document image scanners and more specifically to such scanners capable of performing windowing and multiple scaling.

2. Art Background

Figure 1:
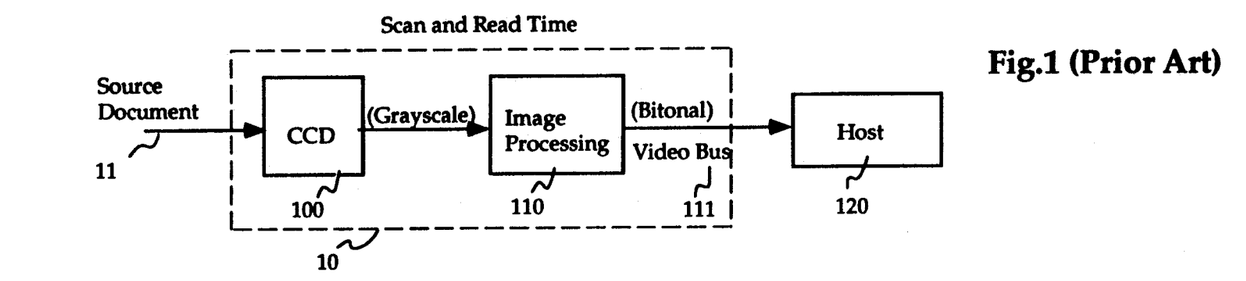
FIG. 1 is a simplified block diagram illustrating a prior art document scanner system.

In the art of document scanning with digital technology, it is typical to scan a document by feeding the document through a data acquisition mechanism such as a charge-coupled device (CCD), which generates digitized data available for downloading to a host computer such as a PC for storage or display. FIG. 1 illustrates a prior art document scanner system in a simplified block diagram. A source document 11 is sent through CCD mechanism 100 to generate a gray scale version of the source document 11. The gray scale image is then image processed by an image-processor 110 to generate bi-tonal information to be output to the host 120 through a video bus 111. A typical application for the prior art system illustrated in FIG. 1 can be found in archiving checks in a bank, where checks are sent through the scanner at a given dot-per-inch ("dpi") resolution to allow the host computer to read the account information for further data processing purposes. Typically, the resolution of the scanned document is fixed as the data is output to the host computer 120.

Figure 2:
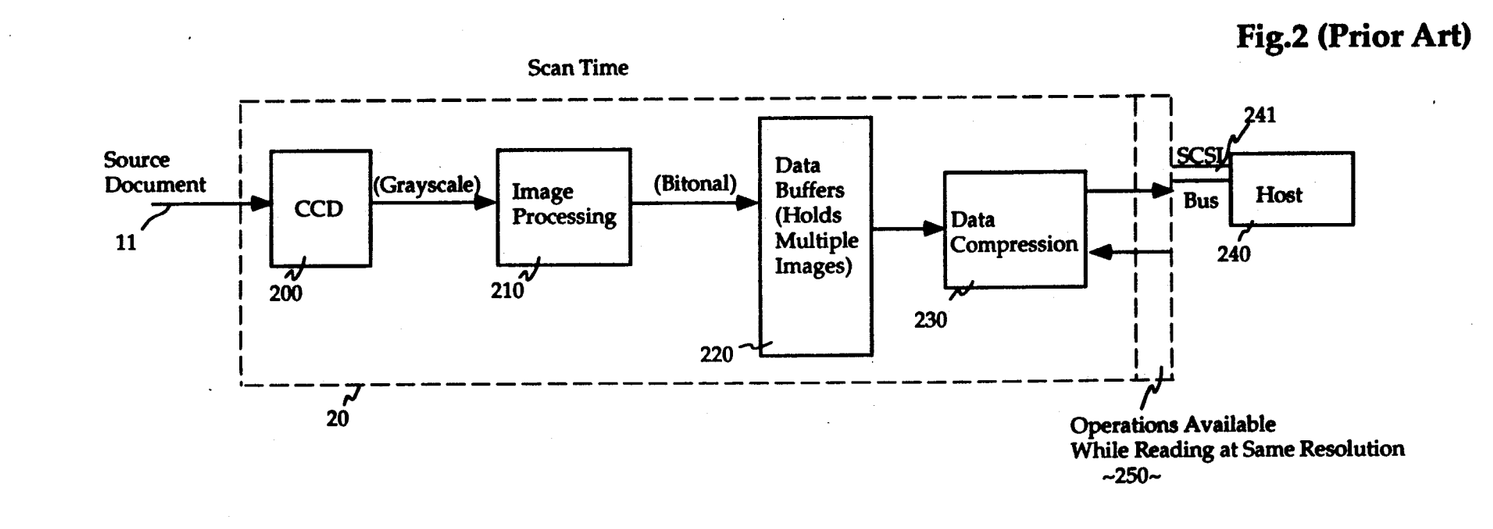
FIG. 2 is a simplified block diagram illustrating another prior art document scanner system.

FIG. 2 illustrates another typical prior art document scanner in a simplified block diagram. A source document 11 is first scanned by CCD 200 to generate data in gray scale format, which is then image processed 210 to generate a bi-tonal version of the data. It is then stored in data buffers 220 which hold multiple images. Data from data buffer 220 can be sent for data compression 230 and then to host 240 through SCSI bus 241 upon request from host 240. Although various operations are available for selecting various portions, zones, of the image stored in data buffers 220 through host 240, the resolution of the image stored in data buffers 230 is fixed.

A common problem associated with the prior art document scanners illustrated in FIGS. 1 and 2 is that a document is scanned in the same resolution by a scanner which is frequently required to perform different functions, such as OCR ("optical character recognition"), bar code reading, ICR ("intelligent character recognition"), image display, creation of an image icon, tiled compression and image storage to magnetic or optical devices. These various functions require different resolutions of the scanned document, not provided for by a single resolution scanner. Furthermore, the level of resolution is inversely proportional to the speed of the scanner, and thus the throughput of the scanner is affected. It is simply impractical for a scanner to be re-scanning at different resolution when reading different portions of the document. Another problem arises when a document has a number of regions with each requiring a different resolution. For example, reading a bar code requires higher resolution than reading a simple text field. However, high resolution is not needed for archiving the entire document so that the system has to make a compromise between the amount of data that has to be stored for the entire document vs. the need for a resolution within a small area of the document.

In Telle U.S. Pat. No. 5,053,885, an electronic copier is capable of processing an image signal to, inter alia, change the magnification of a portion of an original document through its windowing and scaling modes of operation. In Marshall U.S. Pat. No. 4,628,534, a method is described for changing the horizontal and vertical resolutions of an image while the image is in digitized and compressed form. However, Marshall's scaling method aims only to maintain spatial and density integrity of the image with no regard to the edge count.

As will be appreciated by those skilled in the art, the prior art systems preclude optimizing data storage costs, system speed and read accuracies. By requiring a source document to be re-scanned for reading in a different resolution, the throughput of the scanner system is hampered. By storing a source document in a higher resolution than needed, e.g. a 300 dpi resolution for mere 100 dpi text reading, the data storage capacity of the scanner system takes a toll. Also, by indiscriminately eliminating pixels for image reduction, the scanner's read accuracy suffers. Therefore, what is needed is a document image scanner capable of scaling and windowing with intelligence all in a single scan of a document such that the goals of system throughput, storage efficiency and read accuracy are achieved.

SUMMARY OF THE INVENTION

Therefore, it is an object of the present invention to provide a document image scanner capable of reading a scanned document multiple times at resolutions different from the scanned resolution without rescanning.

It is also an object of the present invention to provide a document image scanner capable of reading a scanned document multiple zones multiple times at resolutions different from the scanned resolution without rescanning the document.

It is further an object of the present invention to provide a document image scanner capable of reading a scanned document in multiple overlapping zones with each zone having a resolution different from the scanned resolution in one scan.

A document image scanner for scanning a source document to generate digitized image data and reading the digitized image data is disclosed. The document image scanner comprises a sensor for scanning the source document to generate the digitized image data in a first resolution, with the first resolution having a first vertical and first horizontal resolution. A memory is coupled to the sensor for storing the digitized image data in the first resolution. The digitized image data is represented by a plurality of lines with each line having a predetermined number of pixels in the memory. An input shifter is coupled to the memory for receiving a first number of pixels per line of the digitized image data from the memory. A vertical scaling element is coupled to the memory for changing the first vertical resolution to a second vertical resolution as the digitized image data is transferred to the input shifter from the memory. An output shifter is coupled to the input shifter for receiving a second number of pixels per line of the digitized image data from the input shifter, wherein the ratio of the second number to the first number being the scaling factor. A horizontal scaling element is coupled to the memory for changing the first horizontal resolution to a second horizontal resolution as the digitized image data is transferred to the output shifter from the input shifter. The horizontal scaling element causes the output shifter to receive the second number of pixels per line. An edge retention element is coupled to the horizontal and vertical scaling element and to the input shifter for preserving an edge transition between pixels as they are transferred to the output shifter when the second resolution is less than the first resolution. The edge transition is formed by three consecutive pixels from the input shifter with the middle pixel being in a different state that of its previous and next pixels. And a compressor is coupled to the output shifter for compressing the digitized image data from the output shifter. The document further comprises a windowing element coupled to the vertical scaling element for selecting a portion of the digitized image data to be transferred to the input shifter.

BRIEF DESCRIPTION OF THE DRAWINGS

The objects, features and advantages of the present invention will become apparent to one skilled in the art from reading the following detailed description in which.

DETAILED DESCRIPTION OF THE INVENTION

Figure 3:
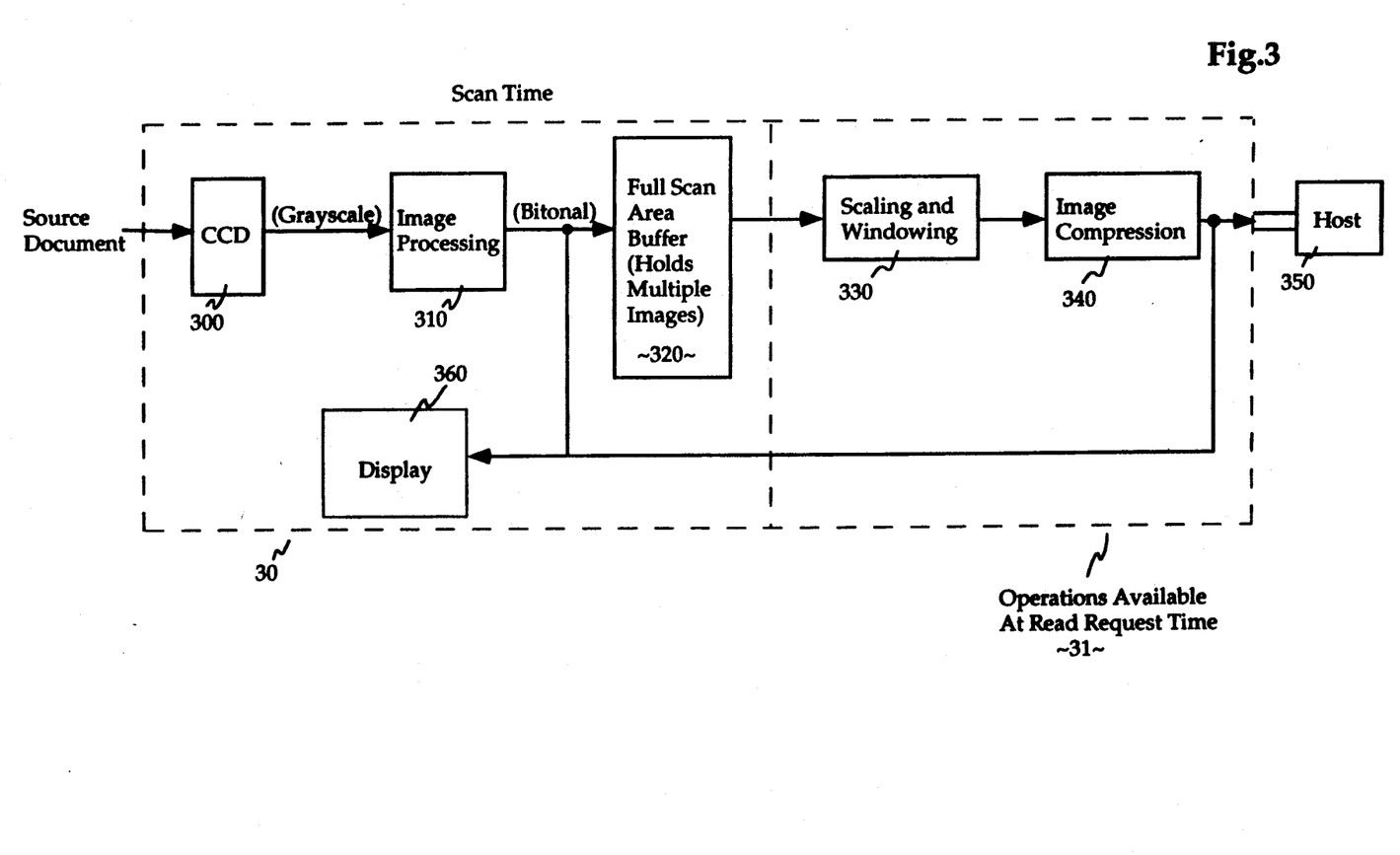
FIG. 3 is a simplified block diagram illustrating a document scanner incorporating variable resolution windows of the present invention.

FIG. 3 illustrates a simplified block diagram of a document scanner incorporated variable resolution windows of the present invention. As illustrated in FIG. 3, a document is scanned through CCD 300 to generate gray scale data for image processing 310. Bi-tonal data from image processing 310 is stored in the full scan area buffer 320 during the scan time. At the same time, the scanned document in the bi-tonal version can be made readily available for display at 360. The bi-tonal data in buffer 320 is windowed, scaled, and then image compressed, upon request from host 350. Reading by host 350 may be performed multiple times at variable resolutions either lower or higher than the resolution of the stored image in buffer 320 for use in bi-tonal, gray scale, OCR, ICR, bar code, storage, display or similar operations. The result of the operation through scaling and windowing at 330 can also be made available for display at 360.

Figure 4:
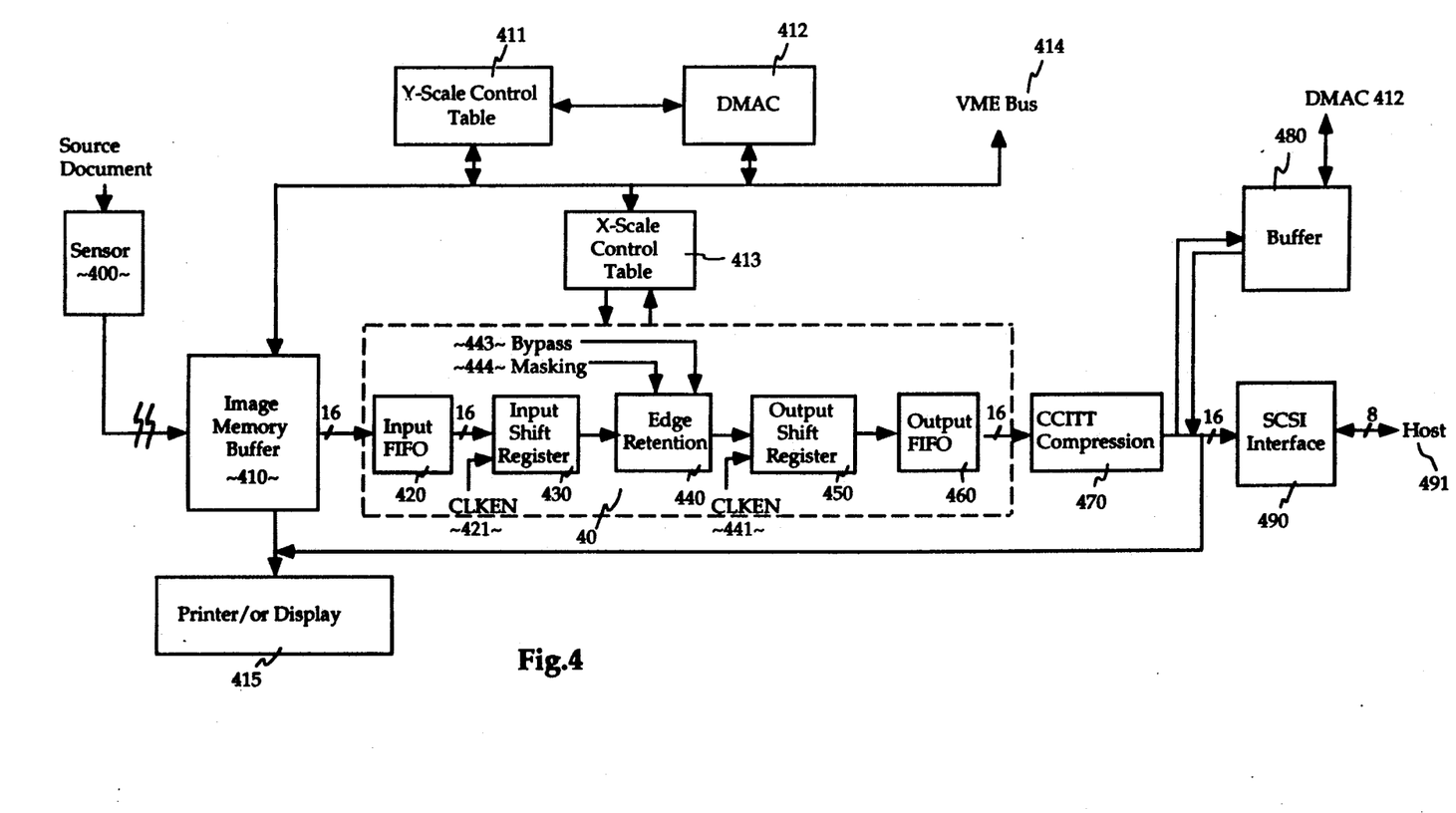
FIG. 4 illustrates a functional block diagram of a document image scanner incorporating variable resolution windows of the present invention.

FIG. 4 illustrates a simplified block diagram of a document image scanner system incorporating the variable resolution windows of the present invention. A source image is scanned by sensor 400 and stored in image memory buffer 410, which is currently 8 or 16 megabytes in size. The format of data sotred in image memory buffer 410 is such that the data can readily be downloaded to a printer or display terminal 415. The output from image memory buffer 410 is also coupled to a scaling mechanism 40 comprising input FIFO 420, input shift register 430, edge retention mechanism 440, output shift register 450 and output FIFO 460. The scaling mechanism 40 is coupled to a host 491 through a compression circuit 470, buffer 480 and SCSI interface 490. VME bus 414 is utilized to couple a direct memory access controller ("DMAC") 412, Y-scale control table 411 and X-scale control table 413 to image memory buffer 410. X-scale control table 413 is coupled between VME bus 414 and scaling mechanism 40. After a document is scanned by sensor 400, the image data is stored in image memory buffer 410 for manipulation. In accordance with the teaching of the present invention, the image data stored in image memory buffer 410 can be read multiple times at different resolutions without rescanning the document. Also, an operator of the document image scanner can read up to a number of separate zones, or portions, of the image stored in image memory buffer 410 multiple times at different resolutions from the scanned resolutions without rescanning the document. Further, an operator may read up to a number of overlapping zones or portions, of the stored image data multiple times at different resolutions from the scanned resolution without rescanning the document. Additionally, an operator may perform all reads at a lower or higher resolution than the scanned resolution, as well as performing all reads in either different resolutions in uncompressed format or compressed format, without rescanning the document.

With reference still made to FIG. 4, the operation of the document image scanner of the present invention is performed under the control of the host computer 491, which may prescribe the following for any given read of the image data: a) resolution, b) window size, c) window location, d) compression format, wherein each data read can be used for single or multiple purposes. Scaling from one resolution to another involves either pixel and line duplication or elimination for enlargement and reduction, respectively, which are well-known conventional techniques. Additionally, the processing requires masking and padding. Masking allows for forcing the edges of documents and the background to be a given color. Padding is used in the "X" dimension to allow both input and output lines to obtain 16 bit boundaries. Padding can also be used to force all resulting images to be of the same size.

Scaling consists of both X and Y scaling elements. The X-scaler comprises a control table 413, an input FIFO 420, an input shift register 430, an edge retention circuit 440, an output shift register 450 and an output FIFO 460. data is supplied from image memory buffer 410 by Y-scaler 411 and passed along for data compression by using an algorithm such as the one specified in CCITT recommendations 470.

Control table 413 is implemented within a FIFO chip, which is loaded by the microprocessor once through VME bus 414 prior to an operation. During the read operation, control table 413 will be read out in its entirety once for every line to be processed.

Input FIFO 420 receives input from image memory buffer 410 under the control of Y-scaler 411 and DMAC 412. Data from the last element is transferred into input shift register 430. Between stages of input FIFO 420, data can be scaled by 50%, bit reversed, and/or byte swapped. Having less than two elements loaded will cause input FIFO 420 to present a DMA request to Y-scaler 411 wherein the request is removed prior to input FIFO 420 becoming full. Having less than one element will inhibit the control state machine.

Control table 413, input FIFO 420 and output FIFO 460 form a control state machine for scaling mechanism 40. When the control state machine is not running, input and output shift registers 430, 450 are inhibited. The control state machine runs whenever there is data in input FIFO 420 and room in output FIFO 460. When the control state machine is running and the bypass bit 443 is set, both output and input FIFOs 460, 420 run freely with masking 444 disabled. Bypass 443 allows data to pass through without scaling, i.e. 1:1 ratio. When the bypass 443 is not present, data is fetched from control table 413. Each element of control table 413 corresponds to two states. During each state, information for control table 413 is sent as shift enables to output and input shift registers 450, 430 and masking information 444 to edge retention circuit 440. Masking 444 allows edge retention circuit 440 to handle the special cases inherent at the beginning and end of a line by indicating to edge retention circuit 440 that the first and last pixels of a line should be left alone.

Input shift register 430 receives clock enable 421 from the control state machine. The first clock enable, and every 16th thereafter will draw data from input FIFO 420. It will be appreciated by those skilled in the art that the 16-clock cycle is for illustration only and a different cycle is necessary for different system's formats. Other clock enables cause data to be shifted up. The uppermost pixel is passed along to edge retention circuit 440.

Edge retention circuit 440 accepts data from input shift register 430 and control state machine. Edge retention circuit 440 supplies the next pixel to be shifted into output shift register 450. That pixel will be of the mask color if masking 444 is present. Normally the next pixel will simply be the last pixel out of input shift register 430. However, there is a special case where a pixel has been skipped which is different from the last pixel that was passed to output shift register 450. That pixel will be the next one placed into output shift register 450. This method is used, instead of a simple random sampling technique, in order to maintain image content. Although edge retention circuit 440, as shown, is coupled to operate with X-scaler 413, it should be apparent to those skilled in the art that it can readily be adapted to operate with both X- and Y- scalers 413, 411 as the system may require.

Output shift register 450 receives clock enable 441 from the control state machine. Clock enables cause data to be shifted in and up from edge retention circuit 440. Every 16th clock enable, or whatever format the system requires, passes data into output FIFO 460.

Output FIFO 460 receives input from output shift register 450. Data from the last element is transferred to data compressor 470 whenever that device presents a data request. Between the stages of output FIFO 460, data can be bit reversed to be in the proper sequence for compression as opposed to the proper order for display. Having more than one element will inhibit the control state machine.

With reference still made to FIG. 4, Y-scaler element comprises a DMA controller ("DMAC") 412 and a gather table 411 which indicates the starting memory address of each line of pixels. Data from Y-scaler 411, 412 is passed along to X-scaler 413. Currently, a given read can consist of up to three phases.

The first and third phases provide leading and trailing pad lines. These phases are optional. The gather table elements all point to a singular word location. This word contains 16 elements all equal to the selected mask color. This word is duplicated as required, until the required number of pad lines have been created. The second phase contains the image. Elements in gather table 411 all point to the beginnings of lines. If a line is to be duplicated, then its address appears more than once in that table 411. If a line is to be skipped, then its address is omitted from the table 411.

The purpose of gather table 411 is to gather information which is randomly placed through image memory buffer 410 and converted into one serial string of data. Effectively, it allows an operator to "window". Just as in DMA where the start address and the count can be specified, gather table 441 takes the whole stream in contiguous memory and picks out entries of information by specifying address and length in image memory buffer 410 to be passed to input FIFO 420. As will be appreciated by those skilled in the art, the windowing mechanism is based on adherence to NTSC standard for scanners. As such, when data is transferred to input FIFO 420, it is already scaled in the Y-direction, if requested to do so. For example, for scaling from resolution of 300 dpi to 200 dpi, Y-scaler control table 411 allows the operator to pick out two pixels out of three in each line of memory, representing from 300 dpi to 200 dpi to pass to input FIFO 420.

Input shift register 430 and output shift register 450 perform the required serialization of the information. In a case where data is being reduced, input shift register 430 operates whenever there is data available from input FIFO 420 and output shift register 450 operates in a rate proportional to the rate of data reduction. For example, if input shift register 430 is shifting data out at 24 megapixels per second, output shift register will operate at 16 megapixels per second in a two-thirds reduction scheme. Note that output shift register 450 achieves data reduction by skipping a clock in every three clocks in a two-thirds reduction.

Figure 5:
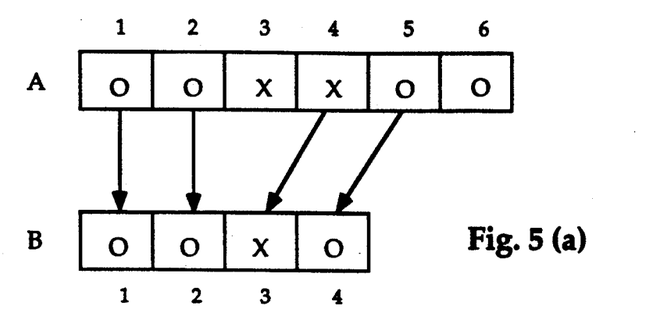
FIGS. 5(a), 5(b) and 5(c) illustrates the operation of an edge retention circuit in the present invention.
Figure 6:
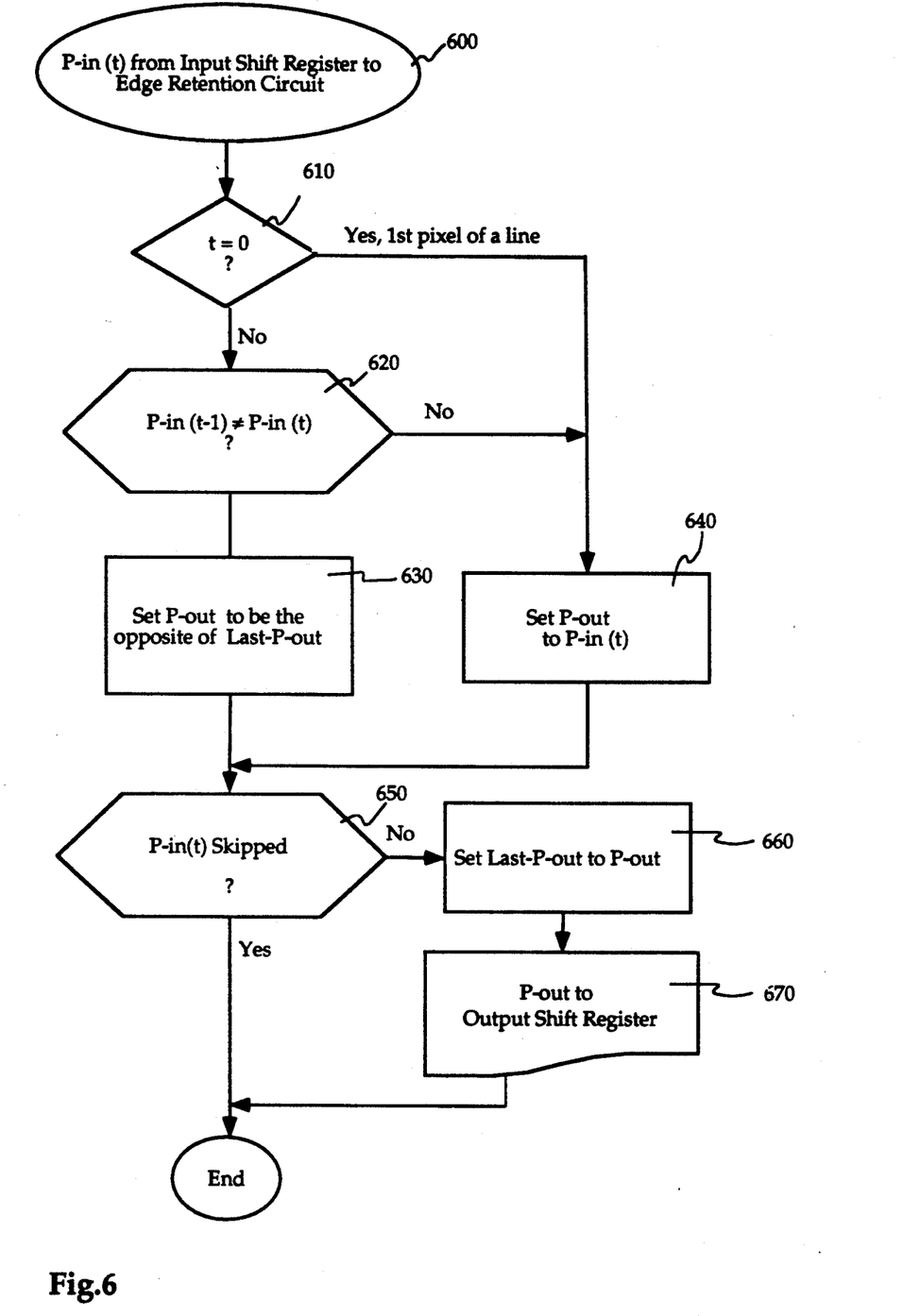
FIG. 6 is a flow chart illustrating the handling of a next pixel in the edge retention circuit in the present invention.

With reference still made to FIGS. 5(a), 5(b), 5(c), the operation of edge retention circuit 440 will now be described by way of an example. Edge retention circuit 440 represents the intelligent portion of scaling circuit 40 in that edge retention circuit 440 prevents the removal of a pixel when X-scale control table 413 requires a pixel to be skipped by output shift register 450. As will be apparent to those skilled in the arts, edge retention circuit 440 has no effect on images which have features larger than one pixel. Referring to FIG. 5(a), in a two-thirds reduction from object A to object B, pixel 3 in object A is removed while the edge between pixels 2, 3 and 4 is accurately reflected by the resulting object B. In this case, edge retention circuit still has no effect on the resulting object B. Referring to FIG. 5(b), a two-thirds reduction from object C to object D1 will normally remove pixel 3 in object C, thus eliminating the edge between pixels 2, 3 and 4. As a result, object D1 loses the information contained in pixel 3 of object C represented by an "x" mark, which may be a dark pixel between two white pixels, for example. With edge retention circuit 440, the information in pixel 3 is preserved by edge retention circuit 440 setting a condition at pixel 3 such that the resulting pixel 3 at object D2 is forced to be the alternate color of pixel 4 of object C by virtue of the preset condition. As a result, the edge between pixels 2, 3 and 4 in object C is retained by forcing pixel 3 in object D2 to be the alternate color. Referring to FIG. 5(c), the edges between pixels 2, 3, 4 and 5 would not have been maintained when pixel 3 is removed in a two-thirds reduction from object E to object F1. With edge retention circuit 440, a first edge is recognized when pixel 4 in object E is output in object F1 at pixel 3. With edge retention circuit 440, pixel 3 in object F1 will be forced to be its alternate color to reflect the edge between pixels 3 and 4 in object E. Furthermore, the edge retention circuit recognizes that an edge also exists between pixels 3, 4 and 5 such that pixel 4 in object F1 is also forced to be its alternate color. As such, the edge retention circuit can affect pixels which are not normally eliminated from the image in a normal reduction process to maintain read accuracy. FIG. 6 illustrates the decision-making flow for the next pixel in an edge retention scheme. When pixel P-in(t) is transferred from the input shift register to the edge retention circuit (600), a decision as to whether pixel P-in(t) is first of a line is made (610). If pixel P-in(t) is the first pixel of a line, the edge retention circuit outputs P-in(t) as its output pixel P-out (640). If P-in(t) is not skipped (650), pixel P-out takes on the vale of its previous P-out (660) and is output by the edge retention circuit to output shift register (670). If P-in(t) is not the first pixel of a line (610) and if P-in(t) is not the same as its previous pixel, P-in(t-1), P-out is set to be the opposite of its previous P-out (630). Thereafter, P-out is output by the edge retention circuit to the output shift register depending upon whether P-in(t) was skipped not (650).

Reference is now made to FIG. 4. Output shift register 450 transfers a stream of serial data from edge retention circuit 440 into a 16 bit wide word before shifting the data to compressor 470 through output FIFO 460. It should be appreciated by those skilled in the arts that compressor 470 represents a video compression/expansion processor. The compressed data could be output to buffer 480 under the control of DMAC 412. At the same time host 491 may come in through SCSI interface 490 to request data from buffer 480. DMAC 412 is programmed to give an interrupt to a local processor (not shown) coupled through VME bus 414 every 16K of data. As a result, data in buffer 480 can be incrementally output to host 491 as it becomes available. Thus, every time there is sufficient data in buffer 480, the local processor requests DMAC 412 to set up SCSI interface 490 to transfer data.

The foregoing description of the invention has been presented for the purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A document image scanner for scanning a source document to generate digitized image data and reading said digitized image data, comprising:
    sensor means for scanning said source document to generate said digitized image data in a first resolution, said first resolution having a first vertical and first horizontal resolution;
    memory means coupled to said sensor means for storing said digitized image data in said first resolution, said digitized image data being represented by a plurality of lines with each line having a predetermined number of pixels in said memory means;
    input shifting means coupled to said memory means for receiving a first number of pixels per line of said digitized image data from said memory means;
    vertical scaling means coupled to said memory means for changing said first vertical resolution to a second vertical resolution as said digitized image data is transferred to said input shifting means from said memory means;
    output shifting means coupled to said input shifting means for receiving a second number of pixels per line of said digitized image data from said input shifting means, the ratio of said second number to said first number being the scaling factor;
    horizontal scaling means coupled to said memory means for changing said first horizontal resolution to a second horizontal resolution as said digitized image data is transferred to said output shifting means from said input shifting means, said horizontal scaling means causing said output shifting means to receive said second number of pixels per line, said second number being a function of said second horizontal resolution; and
    edge retention means coupled to said horizontal scaling means and to said input shifting means for preserving an edge transition between pixels as they are transferred to said output shifting means when said second resolution is less than said first resolution, wherein said vertical scaling means and said horizontal scaling means may be enabled multiple times using a different second vertical resolution and a different second horizontal resolution after a single scan of said source document.

2. A document image scanner according to claim 1, further comprising windowing means coupled to said vertical scaling means for selecting a portion of said digitized image data to be transferred to said input shifting means.

3. A document image scanner according to claim 2, wherein said windowing means selects said portion of said digitized image data by specifying a plurality of starting addresses and lengths in said memory means, each starting address and length specifying a location in said memory means and the number of pixels following said location in said memory means.

4. A document image scanner according to claim 3, wherein said input shifting means comprises:
    first FIFO memory coupled to said memory means for receiving said digitized image data from said memory and storing said digitized image data in a "first-in, first-out" manner; and
    first shift register coupled to said first FIFO memory for serializing said digitized image data stored in said first FIFO memory by serially transferring said first number of pixels per line from said first FIFO memory.

5. A document image scanner according to claim 4, wherein said output shifting means comprises:
    second shift register coupled to said first shift register for serially receiving said second number of pixels per line of said digitized image data in response to said horizontal scaling means;
    second FIFO memory coupled to said second shift register for storing said serially received second number of pixels per line in a predetermined format.

6. A document image scanner according to claim 5, further comprising:
- compression means coupled to said output shifting means for compressing said digitized image data from said output shifting means;
- output buffer means coupled to said compression means for storing said digitized image data after it is compressed for output;
- host computer coupled to said output buffer means for providing the compressed said digitized image data for further data processing.

7. A document image scanner according to claim 3, wherein said windowing means specifies a plurality of windows of said digitized image data as said digitized image data is transferred to said input shifting means, each window being defined by a plurality of starting addresses and lengths in said memory means.

8. A document image scanner according to claim 3, wherein said edge retention means is also coupled to said vertical scaling means for preserving an edge transition between pixels in the vertical direction.

9. A method of scanning a source document to generate digitized image data and reading said digitized image data, comprising the steps of:
(a) scanning said source document through sensor means to generate said digitized image data in a first resolution, said first resolution having a first vertical and first horizontal resolution;
(b) storing said digitized image data in memory means coupled to said sensor means in said first resolution, said digitized image data being represented by a plurality of lines with each line having a predetermined number of pixels in said memory means;
(c) receiving a first number of pixels per line of said digitized image data from said memory means through input shifting means coupled to said memory means;
(d) changing said first vertical resolution to a second vertical resolution in vertical scaling means coupled to said memory means as said digitized image data is transferred to said input shifting means from said memory means;
(e) receiving a second number of pixels per line of said digitized image data from said input shifting means through output shifting means coupled to said input shifting means, the ratio of said second number to said first number being a predetermined scaling factor;
(f) changing said first horizontal resolution to a second horizontal resolution in horizontal scaling means coupled to said memory means as said digitized image data is transferred to said output shifting means from said input shifting means, said horizontal scaling means causing said output shifting means to receive said second number of pixels per line said second number being a function of said second horizontal resolution; and
(g) preserving an edge transition between pixels in edge retention means coupled to said horizontal scaling means and to said input shifting means as they are transferred to said output shifting means when said second resolution is less than said first resolution;
(h) determining whether said digitized image data is to be processed at a different second resolution; and
(i) if said digitized image data is to be processed at said different second resolution, repeating steps (c) through (h) using a different second vertical resolution and a different second horizontal resolution.

10. A method according to claim 9, further comprising the steps of selecting a portion of said digitized image data to be transferred to said input shifting means through windowing means coupled to said vertical scaling means.

11. A method according to claim 10, wherein said windowing means selects said portion of said digitized image data by specifying a plurality of starting addresses and lengths in said memory means, each starting address and length specifying a location in said memory means and the number of pixels following said location in said memory means.

12. A document image scanner according to claim 11, wherein said input shifting means comprises:
- first FIFO memory coupled to said memory means for receiving said digitized image data from said memory and storing said digitized image data in a "first-in, first-out" manner; and
- first shift register coupled to said first FIFO memory for serializing said digitized image data stored in said first FIFO memory by serially transferring said first number of pixels per line from said first FIFO memory.

13. A method according to claim 12, wherein said output shifting means comprises:
- second shift register coupled to said first shift register for serially receiving said second number of pixels per line of said digitized image data in response to said horizontal scaling means;
- second FIFO memory coupled to said second shift register for storing said serially received second number of pixels per line in a predetermined format.

14. A method according to claim 13, further comprising the steps of:
- storing said digitized image data in output buffer means coupled to said compression means after it is compressed for output; and
- providing the compressed said digitized image data for further data processing in a host computer coupled to said output buffer means.

15. A method according to claim 11, wherein said windowing means specifies a plurality of windows of said digitized image data as said digitized image data is transferred to said input shifting means, each window being defined by a plurality of starting addresses and lengths in said memory means.

16. A document image scanner for scanning a source document to generate digitized image data and reading said digitized image data, said document image scanner comprising sensor means for scanning said source document to generate said digitized image data in a first resolution, said first resolution having a first vertical and first horizontal resolution, memory means coupled to said sensor means for storing said digitized image data in said first resolution, said digitized image data being represented by a plurality of lines with each line having a predetermined number of pixels in said memory means, wherein the improvement comprises:
- input shifting means coupled to said memory means for receiving a first number of pixels per line of said digitized image data from said memory means;
- vertical scaling means coupled to said memory means for changing said first vertical resolution to a second vertical resolution as said digitized image data is transferred to said input shifting means from said memory means;

output shifting means coupled to said input shifting means for receiving a second number of pixels per line of said digitized image data from said input shifting means, the ratio of said second number to said first number being the scaling factor;

horizontal scaling means coupled to said memory means for changing said first horizontal resolution to a second horizontal resolution as said digitized image data is transferred to said output shifting means from said input shifting means, said horizontal scaling means causing said output shifting means to receive said second number of pixels per line, said second number being a function of said second horizontal resolution; and edge retention means coupled to said horizontal scaling means and to said input shifting means for preserving an edge transition between pixels as they are transferred to said output shifting means when said second resolution is less than said first resolution, wherein said vertical scaling means and said horizontal scaling means may be enabled multiple times using a different second vertical resolution and a different second horizontal resolution after a single scan of said source document.

17. A document image scanner according to claim 16, wherein the improvement further comprises compression means coupled to said output shifting means for compressing said digitized image data from said output shifting means.

18. A document image scanner according to claim 17, wherein the improvement further comprises windowing means coupled to said vertical scaling means for selecting a portion of said digitized image data to be transferred to said input shifting means.

19. A document image scanner according to claim 18, wherein said windowing means selects said portion of said digitized image data by specifying a plurality of starting addresses and lengths in said memory means, each starting address and length specifying a location in said memory means and the number of pixels following said location in said memory means and said edge retention means is coupled to said vertical scaling means for preserving an edge transition between pixels in the vertical direction.

20. A document image scanner according to claim 19, wherein said input shifting means comprises:

first FIFO memory coupled to said memory means for receiving said digitized image data from said memory and storing said digitized image data in a "first-in, first-out" manner; and first shift register coupled to said first FIFO memory for serializing said digitized image data stored in said first FIFO memory by serially transferring said first number of pixels per line from said first FIFO memory.

21. A document image scanner according claim 20, wherein said output shifting means comprises:

second shift register coupled to said first shift register for serially receiving said second number of pixels per line of said digitized image data in response to said horizontal scaling means; and second FIFO memory coupled to said second shift register for storing said serially received second number of pixels per line in a predetermined format.

* * * * *